HEAT-SENSITIVE COPYING-PAPER

Original Filed Feb. 2, 1951

INVENTOR.
Bryce L. Clark
Earl S. Miller
BY Carpenter, Abbott, Coulter & Kinney
ATTORNEYS United States Patent Office Re. 24,554
Reissued Oct. 21, 1958

24,554

HEAT-SENSITIVE COPYING-PAPER

Bryce L. Clark and Carl S. Miller, Ramsey County, Minn., assignors to Minnesota Mining & Manufacturing Company, St. Paul, Minn., a corporation of Delaware Original No. 2,710,263, dated June 7, 1955, Serial No. 209,062, February 2, 1951. Application for reissue April 30, 1957, Serial No. 669,389

19 Claims. (Cl. 117—36)

Figure 1:
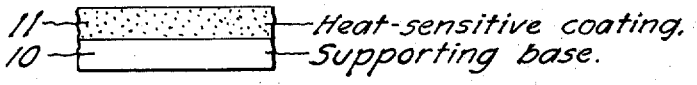

Matter enclosed in heavy brackets [ ] appears in the original patent but forms no part of this reissue specification; matter printed in italics indicates the additions made by reissue.

This invention is concerned with heat-sensitive thermographic duplicator sheet material or copying-paper useful in preparing copies of printed matter or the like, and more specifically with thermographic copying-paper in which particles of fusible material provide a means of obtaining a *permanently* visible change on the application of heat.

This application is a continuation-in-part of our copending application Serial No. 747,340, filed May 10, 1947, *now abandoned.*

Heat-sensitive copying-papers of the type here contemplated are of particular utility in making copies of graphic subject-matter such as printing, drawings, diagrams, pictures, etc. by methods to be described. Such methods involve the irradiation of the graphic subject-matter with intense radiant energy of proper wave-length, the resultant formation of an elevated-temperature pattern corresponding to the graphic matter irradiated, and the utilization of such elevated-temperature pattern in directly producing a corresponding visible pattern in the copying-paper.

Radiant energy suitable for providing the required elevated-temperature pattern may be obtained from a number of sources, including electrically-heated incandescent filaments, electric arcs, and focused sunlight. Electrically-heated incandescent filament lamps are readily available, simple to operate, and safe to use. For copying typewritten letters or the like, a 3000-watt tubular lamp with a coiled filament 10 inches in length has been found eminently suitable. The lamp is located in a reflector which concentrates the light in a narrow line, and the line of light is moved across the typewritten sheet to provide the required brief intense irradiation. The apparatus and the method of operation are described and claimed in the copending applications of Carl S. Miller, Serial No. 180,617, filed August 21, 1950, *and now Patent No. 2,740,895* and Serial No. 747,338, filed May 10, 1947, *now Patent No. 2,740,896.*

In our novel heat-changeable copying-paper, heat-sensitivity is obtained by employing a layer of inherently transparent fusible material in the form of light-dispersing particles. The fusion or melting of these particles results in a change in the optical properties of the heated portion, and makes possible the reproduction of typewritten messages or the like by the methods hereinabove indicated.

Other workers have designed and produced heat-sensitive sheet materials, for a variety of purposes. One common purpose is for the tracing of lines or figures with a heated stylus; the pressure of the stylus displaces the heated surface layer to produce a visible trace. Another application is in determining the temperature of a surface, in which case a large quantity of heat energy is available and only one surface of the test sheet is ordinarily in contact with another surface. In many prior art heat-sensitive sheet materials, the sheet is not transparent to infra-red radiation, hence direct exposure to high-intensity infra-red would result in absorption of such energy, conversion to heat, and activation of the entire heat-sensitive sheet. Other known products when heated become sticky, or the sensitive layer is weakened and splits or offsets; or the visible change produced on heating is not permanent. We have found that all such products are unsuitable, in one or more particulars, for application as heat-sensitive copying-papers in accordance with the methods hereinabove indicated.

It is therefore a primary object of this invention to provide heat-sensitive thermographic copying-papers which avoid these and other deficiencies, for the indicated purposes, of prior art heat-sensitive sheet materials and which are adapted for use in the reproduction of graphic subject-matter, such as typewritten messages, by methods involving brief intense irradiation of such message while in heat-conductive relationship to the copying-paper as more fully described in the applications of Carl S. Miller, previously mentioned. A particular object is the provision of such a copying-paper which is susceptible to "front-printing" methods wherein the irradiation of the typewritten message occurs through the copying-paper, which in such cases must be capable of transmitting the heat-producing radiation. Other objects will be pointed out or will become apparent on consideration of the specification taken as a whole.

Figure 2:
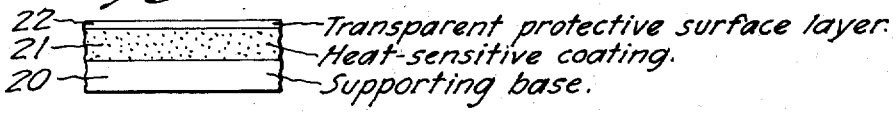
Figure 3:
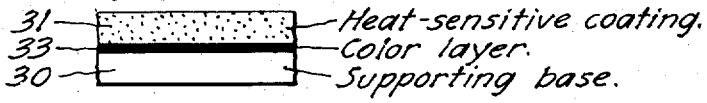
Figure 4:
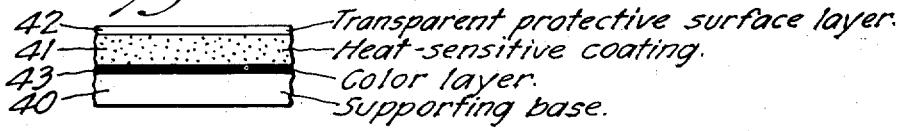
Figure 5:
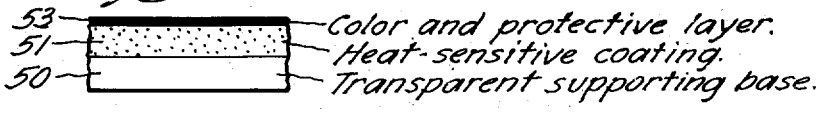

Figures 1–5 of the accompanying drawing are diagrammatic, enlarged representations of cross-sections of five typical embodiments of our novel heat-sensitive copying-paper. In the structure of Figure 1, a non-transparent heat-sensitive layer 11 is carried by a supporting base 10, which may be transparent or non-transparent, colored or uncolored. In Figure 2, the non-transparent heat-sensitive layer 21, carried by the supporting base 20, is further protected by a transparent surface layer 22. In Figure 3, a color layer 33 is interposed between the uncolored base 30 and the non-transparent heat-sensitive layer 31. The combination structure of Figure 4 includes a base 40, a non-transparent heat-sensitive layer 41, an interposed color layer 43, and a protective surface layer 42. In the structure of Figure 5, the color layer 53 serves both as a color layer and as an outer protective layer for the non-transparent heat-sensitive layer 51, which is carried by the transparent supporting base 50.

Where terms such as "transparent" and "non-transparent" are employed it, is to be understood that they refer to visible light. The term "non-transparent" is used in preference to "opaque," since the coatings do transmit some light, even though such light is highly diffused. The term "infra-red-transmitting" is used to designate materials which permit the passage of the invisible infra-red radiation. It is this latter radiation which is largely, if not entirely, responsible for the increase in temperature observed and utilized in the method of reproduction of graphic matter here involved.

One way in which reproductions of typewritten documents or the like may be made is by placing the copying-paper against the back or unprinted surface of the document, preferably with the heat-sensitive surface toward the same, and then irradiating the printed face of the document. Absorption of the radiation by the printed characters results in generation of heat which is then conducted through the thin paper to the heat-sensitive surface, producing a visible change therein. This "back-printing" method is thus capable of producing direct reproductions where the original is printed on a satisfactorily thin and heat-conductive paper or other material, but is not so satisfactory for heavy book paper, or for thin papers heavily printed on both surfaces, or for certain other applications.

In "front-printing," however, as hereinbefore mentioned, the effective radiation first passes through the non-transparent heat-sensitive copying-paper, which must therefore be infra-red-transmitting. The heat pattern resulting from absorption of this radiation of the printed surface causes a visible change in the copying-paper, resulting in the reproduction of the printed message. This reproduction is a direct copy of the original when viewed from the side of the sheet at which the radiation was initially directed. Hence with a structure such as that indicated in Figure 5 of the drawing, the sheet is placed with the non-transparent but infra-red-transmitting color layer against the original printed surface during the front-printing operation, and the copy is subsequently observed through the transparent supporting base. The clarity and contrast of the resulting copy produced by front-printing is thus independent of the thickness of the original printed page.

Thus we have found that certain requirements must be met by the non-transparent, heat-sensitive coating as well as by the copying-paper as a whole in order to assure the production of clear and sharp copies, *and in particular of permanently visible copies,* by methods here contemplated. The following specific examples will illustrate these requirements, but are not to be construed as limiting the scope of the invention, since many other modifications will become apparent on consideration of the disclosures here made.

EXAMPLE 1

Paper in continuous sheet form is coated with a black undercoat, and subsequently with a coating consisting essentially of an inherently transparent fusible material in the form of a non-transparent light-scattering particulate layer. A further thin transparent protective surface coating may be applied if desired. The separate coatings in solution or dispersion form are applied in controlled thickness, as by means of a spreader knife or bar, and the volatile solvent removed by evaporation.

The black undercoat as applied consists of a mixture of 50 grams of a uniform suspension of 200 grams of nigrosine dye in one liter of heptane, and 10 grams of a 5% solution of latex crepe rubber in heptane. The rubber acts as a binder for the particles of dye. Suitable anti-oxidants, vulcanizing agents, or other ingredients contributing to improved aging life or other properties of the rubber may be added if desired. The coating knife is set at an orifice of 2 mils (.002 inch) to provide a thin but effective substantially opaque black background or undercoat. Heat may be applied to remove the solvent and to cure the binder.

The non-transparent heat-sensitive layer is prepared by coating a mixture of 50 grams of a suspension of 100 grams of cadmium stearate in 500 milliliters of heptane, and 10 grams of the 5% rubber solution, at a coating orifice of 3.5 mils. The cadmium stearate, which is insoluble in heptane, is suspended in finely divided particulate form in the volatile vehicle by prolonged milling in a ball mill. This coating is dried at a temperature less than the melting-point of the cadmium stearate, for example, at normal room temperature. The cadmium stearate layer remains as a well-bonded non-transparent light-diffusing crystalline or discontinuous surface layer.

While the structure thus provided produces excellent copies without offsetting or splitting of the heat-sensitive layer, a further thin surface coating or sizing of a 5% solution of cellulose acetate in acetone, applied at an orifice of 1.5 mils and dried at room temperature, provides a desirable additional degree of surface protection for the fusible layer. The acetone is a non-solvent for the components of the previously applied layer, and the solution may therefore be applied without appreciably transparentizing the heat-sensitive coating.

Heating the sheet material to or above approximately the melting-point of cadmium stearate transparentizes the heat-sensitive layer and allows the black undercoat to become permanently visible at the heated area.

The cadmium stearate was prepared by reaction in dilute aqueous solution of one mol of cadmium acetate with two mols of sodium stearate, prepared from commercial triple-pressed stearic acid and sodium hydroxide. The precipitated cadmium stearate was recovered by filtration, washed with water, and dried at room temperature. It had a melting point of approximately 100 C., and in thin films was clear and transparent.

*Cadmium stearate and rubber are mutually compatible, as shown by the different melting-points of the cadmium stearate alone and of the mixture after blending at temperatures somewhat above the melting point of the cadmium stearate. For example, heating together for 20 minutes at 140–160° C. a mixture of the cadmium stearate melting at about 100° C. with about one-twentieth its weight of rubber provided a compatible blend melting at 128–132° C.*

*In this and similar cases the melting point is conveniently determined on a Fisher melting-point apparatus, the samples being placed on a thin glass support and observed through a binocular microscope. The melting-point is taken as that temperature at which the powder or solidified droplet liquefies sufficiently to flow out as a smooth layer. The rate of temperature rise is about one degree per minute, and in no case greater than three degrees per minute.*

Since nigrosine dye is highly absorbent to infra-red, this sheet was not suitable for front-printing. The same was true of copying-paper in which carbon black was employed as the coloring agent in the color layer. However, such sheets provide clear and distinct copies of typewritten letters and the like by the back-printing process as previously described, in which the heat-sensitive side of the copying-sheet is pressed against the back surface of a thin printed page which is then irradiated on the printed or front side.

EXAMPLE 2

In this example, a thin but intensely colored blue background or undercoat is provided by coating the paper or other base sheet material with a mixture of 40 grams of an ultra-marine suspension and 20 grams of a 10% solution of cellulose acetate in acetone, applied at an initial thickness of 2 mils. The ultramarine suspension is prepared by milling 100 grams of the pigment into 200 ml. of acetone in a ball mill.

A second coating is then applied, consisting of a mixture of 50 grams of a suspension of 200 grams of lead laurate in 800 ml. of heptane, and 10 grams of a 5% rubber solution in heptane as used in Example 1. The coating as applied is 4 mils thick. It is dried at room temperature. The dried residue is in the form of a rough, light-dispersive coating, of just sufficient thickness to provide adequate light-diffusing ability and to obtain desired contrast between the coating and the blue background.

A final protective coating of 1.5 mils of a 5% solution of cellulose acetate in acetone is desirably then applied and dried at room temperature.

The resulting heat-sensitive copying-paper appears bluish-white on the coated surface and changes rapidly to an intense blue color at areas heated to or somewhat above the melting-point of lead laurate.

Preparation of the lead laurate was similar to that of the cadmium stearate of Example 1. Specifically, 4060 parts by weight of the lauric acid was stirred into 76,000 parts of water at 80° C. At the same time, a solution of 800 parts of sodium hydroxide in 10,000 parts of water was prepared. The sodium hydroxide solution was added slowly to the fatty acid mixture to form a dilute solution of sodium laurate soap. A solution of 3794 parts of lead acetate trihydrate in 30,000 parts of water was then added slowly with stirring. The entire mixture was heated to 95° C. and allowed to cool. The lead laurate was collected as insoluble waxy lumps, which were washed and dried. The salt prepared from highly purified lauric acid appeared to be fully equivalent to that prepared from a commercial product stated to contain about 90% lauric acid. The melting point of this waxy material was about 87° C.

*Lead laurate and crepe rubber are fully compatible, as shown by means of melting-point tests as described in connection with the cadmium stearate and rubber of Example 1. The melting-point of the heat-blended mixture is increased over that of the waxy material alone.*

The thin ultramarine blue color coat of Example 2 is infra-red-transmitting. When paper having poor infra-red-transmitting qualities is used as the supporting base, the copying-sheet described has the structure shown in Figure 3 of the drawing and is satisfactory for back-printing. However, the same color layer and heat-sensitive layer may be combined with a transparent and infra-red-transmitting backing such as varnished paper, glassine paper, cellulosic films or the like to provide a structure as illustrated by Figure 5 and which is particularly suitable for front-printing.

Analogous results may be obtained with other color layers. For example, toluidine toner may replace the ultra-marine blue to provide a copying-paper which gives red-colored copy against a white or slightly reddish background.

Coatings fusing at temperatures much lower than about 60° C. will obviously be unstable under many customary conditions of storage. On the other hand, for commercial copying operations employing procedures hereinbefore described, the maximum temperature obtainable has been found to be about 120 or 125° C., and we much prefer to operate well below this range because of the heavy power requirements, the short life of the incandescent filament, the possible deterioration of the printed original, and for other reasons. Hence our preferred temperature range is about 60–115° C., i. e., the particles of normally transparent stable organic solid fusible material should melt without appreciable volatilization or decomposition at a temperature within the range of about 60–115° C. to a liquid form having good wetting properties toward the infusible binder.

Where a single fusible material has too sharp a melting point for best results in terms of the clarity and detail of the reproduction, mixtures of two or more fusible materials frequently offer advantages.

A copying-paper comprising a blue undercoat and a lead palmitate non-transparent fusible layer, and produced as described under Example 2, supra, was found to have a conversion range of 8–10° C. with full conversion at about 102° C. The paper was used to copy a typewritten message. The letters appeared dark blue against a clean white background, but individual letters were observed to be slightly blurred. When half of the lead palmitate was replaced by lead laurate, the conversion range was increased to 12–14° C. ending at about 90° C. The individual copied letters were somewhat sharper in detail, but the background was lightly blurred in some areas. Substitution of lead laurate for all of the lead palmitate increased the conversion range to 19–21° C. with full conversion at about 97° C., and gave good detail but caused further darkening or blurring of the background. All of the copies were easily readable.

Substitution of lead caprylate in the above sheet gave a product having a conversion range of 28–30° C., with full conversion at about 99° C. While copy produced with this sheet could still be deciphered, the reproduced letters showed so little contrast in relation to the background that the product could not be considered a commercially satisfactory copying-paper.

The above two specific examples and indicated variations employ quite small proportions of infusible binder with the fusible particulate solids on which the copying process largely depends. Somewhat increased amounts of binder over those illustrated have been successfully applied in similar compositions; for example up to about 10 parts of ethyl cellulose has been combined with correspondingly about 90 parts of various waxy or other fusible particles to produce non-transparent, heat-sensitive coatings which transparentize at approximately the melting-point of the fusible material. When an attempt is made to use much larger proportions of binder, formulations and methods such as are described in Examples 1 and 2 are found frequently to produce substantially transparent coatings, or at least coatings which do not provide the desired high degree of contrast in structures of the type here contemplated. In such cases, a slightly different technique of forming the coating is employed, in which the binder component is deposited as a partially or completely non-transparent, porous, self-sustaining stratum. Exemplary formulas and procedures will now be described for attaining this result.

EXAMPLE 3

| | Parts by weight |
|---|---|
| Hydrogenated fatty oil wax, M. P. 65° C. ("Cornelowax No. 1469") | 11.77 |
| Nitrocellulose (Type RR, 125 sec. viscosity) | 4.20 |
| Ethyl cellulose (Type N, 50 cps. viscosity) | 0.70 |
| Dioctyl phthalate | 2.11 |
| Acetone | 45.50 |
| Toluol | 35.90 |

Dissolve the nitrocellulose in a mixture of 18.20 parts of acetone and 5.60 parts of toluol. To this solution add the other ingredients, including the remainder of the solvents, and reduce to a smooth suspension in a ball mill. Milling is continued until the insoluble wax has been completely broken up into uniform microscopic particles and the suspension can be coated in a smooth, uniform, very thin layer. Where the total charge was 80 lbs., milling for 8 hours in a 75-gallon porcelain-lined ball mill with ½ inch porcelain balls was found to produce the desired suspension.

Apply the suspension as a uniform smooth layer to thin (22 lbs. per ream) clear transparent glassine, in an amount sufficient to provide a dry coating weight of 2 grains per 24 sq. in., and dry at 30% relative humidity and 80° F. The resulting coating is white and non-transparent. *The wax and binder components are compatible, and a copy produced by application of heat to the coated sheet material is permanent, being visible either as a transparency or when held against a distinctively colored background. A colored sheet may be substituted for the clear transparent sheet to provide a colored base or background.* Over [this] *the white, non-transparent* coating, apply a color layer of "Diane blue" pigment in ethyl cellulose, in an amount sufficient to provide a dry coating weight of 0.7 grains per 24 sq. in., and dry at room temperature.

The color layer solution consists of two parts of "Diane blue," an infra-red transmitting blue lake pigment, uniformly dispersed in a solution of two parts of "T–200 Ethocel" ethyl cellulose (49.6% ethoxy) in a mixture of 11 parts heptane and 77 parts toluene, and containing 0.003% of glacial acetic acid as a deflocculant.

The resulting structure corresponds to that shown in Figure 5 of the drawing. It is particularly desirable for copying by the "front-printing" technique, and is also adaptable to "back-printing."

The fusible waxy component of the heat-sensitive coating of Example 3 may readily be extracted, without altering the structure of the infusible binder stratum, by means of suitable selective solvents. When this is done, it is found that the binder remains in the form of a white, light-diffusing and non-transparent, porous self-supporting web. Such a web may be locally transparentized by impregnating it with a drop of melted wax; the spot remains transparent on cooling.

Reducing the proportion of fusible material in the formula of Example 3 tends to raise and broaden the temperature range at which conversion of the non-transparent layer to the transparent form is obtained. In this example the ethyl cellulose serves to reinforce the coating but does not contribute to the light-diffusing properties of the coating. At less than about two parts of the fusible material to one of nitrocellulose the coating will not transparentize until heated well above the melting-point of the "Cornelowax" itself. We therefore prefer to add an amount of the latter such that the conversion temperature of the sheet is approximately the same as the melting point of the fusible material, and to adjust the conversion temperature by selecting a fusible material having the desired melting point. Hydrogenated castor oil wax ("Opalwax"), for example, has a melting point of 85° C. and is quite satisfactory; and other waxes or waxy materials as well as other fusible materials of other melting-points within the desired range and which are otherwise suitable for our purposes have already been indicated. Where soft fusible materials such as waxes are used, increasing the proportion of wax much beyond about a 6:1 ratio makes the coating susceptible to abrasion, since wax particles alone are soft and non-adherent to the backing. The preferred range of proportions in the type of product illustrated by Example 3 is therefore from about two parts of wax to about four parts of wax, to one part of nitrocellulose or the like. In the formula of Example 3, the ratio of wax to nitrocellulose binder is seen to be approximately 2.8 to one.

EXAMPLE 4

A liquid coating composition was prepared from the following ingredients by ball milling as in Example 3.

| | Parts by weight |
|---|---|
| Hydrogenated fatty oil wax, M. P. 65° C. | 1073.7 |
| Nitrocellulose | 382.0 |
| Ethyl cellulose | 62.4 |
| Dioctyl phthalate | 224.7 |
| Acetone | 5800 |
| Toluol | 2460 |

The composition was coated on thin (20–30 lb.) clear transparent glassine at a coating weight, after drying, of approximately 3 grains per 24 sq. in. An infra-red transmitting color layer was superimposed over the heat-sensitive layer, as in Example 3. The sheet provided sharp, clear copies of typewritten originals under front-printing thermocopying conditions as herein described. Conversion of the non-transparent heat-sensitive waxy layer to the transparent condition occurred at about 65° C. and within a range of about 2° C. The non-transparent binder stratum was somewhat less porous than that of Example 3 when coated under identical conditions, or approximately equal in porosity when coated under conditions of higher humidity.

*The binder material and fusible material of Example 4 are compatible, the heat-blended mixture melting at a higher temperature than the fusible material alone.*

In all of these constructions, the non-transparent heat-sensitive layer is visibly altered when heated to or somewhat above the melting point of the fusible particles of which it is comprised. The exact temperature at which the visual effect is obtained is found to be a function not only of the melting point of the fusible material but also is a function of the relative amount of such material and the presence or absence of various modifying agents. It is also a function of the test procedure employed, as will be further pointed out.

EXAMPLE 5

A series of coatings was prepared from "Cornelowax 1469" and nitrocellulose in different ratios, applied from a mixture of acetone and toluene, and the temperatures at which the light-diffusing coatings became clear and transparent were determined. At one part of wax to one of nitrocellulose, the coating did not become completely transparent until about 120° C. As the ratio of wax to nitrocellulose was increased to 2:1, 3:1, 4:1, 5:1, and 6:1, the temperature required for transparency became, respectively, 110° C., 95° C., 83° C., 67° C., and 67° C. At higher ratios than six of the wax to one of the nitrocellulose, the coating was found to be undesirably soft for some applications, particularly where the sheet was subjected to scuffing or abrasion.

The specific temperature required with each wax:binder ratio is somewhat dependent on the ratio of the two volatile components of the coating composition. Increased amounts of toluene ordinarily require the presence of somewhat larger amounts of the wax component in order to achieve full transparency at a comparable temperature. Omitting the toluene, on the other hand, results in a coating which is undesirably close to the transparent condition immediately after drying and without heating. The above wax-binder ratios and corresponding transparentizing temperatures were all based on identical acetone-toluene ratios in the coating composition.

The addition of small proportions of plasticizers compatible with the nitrocellulose, such as dioctyl phthalate, reduced the amount of wax required to reach the minimum transparentization temperature.

Where there was a tendency for the heated area to appear slightly foggy, presumably due to ineffective wetting of the binder by the melted wax, a trace of plasticizer was found to improve such wetting action and to impart improved clarity to the transparentized area. Large amounts of such plasticizer produced a coating which was not sufficiently light-diffusing to provide the desired degree of contrast.

Other plasticizers and modifiers may be selected to provide analgous effects with other fusible materials and other binders.

EXAMPLE 6

Waxy polyethylene glycol ("Carbowax 6000") was ball milled in acetone at a concentration of 30% wax. Nitrocellulose (125 sec.) was dissolved in a mixture of 50 parts acetone and 40 parts toluene to a concentration of 10%. A mixture of 20 parts of the wax dispersion and 40 parts of the nitrocellulose solution was coated on thin glassine at a wet thickness of 3 mils, and was dried at room temperature. The resulting light-diffusing coating could be transparentized at about 56° C. Thermocopies prepared with this copying paper were readily visible when the sheet was held against a dark background. However, improved results were obtained when the heat-sensitive coating was visibly masked and mechanically protected by the application of an infra-red-transmitting color coat of "Diane blue" in ethyl cellulose, as in Example 3, or in rubber hydrochloride ("Pliolite"), applied from heptane solution. In place of "Diane blue," other infra-red-transmitting coloring agents such as Monastral blue, methyl violet, or Ponsol jade green have proven useful in such applications.

The polyethylene glycol particles could be easily extracted from the non-transparent coating with suitable solvent, leaving a non-transparent porous stratum of the binder. After the coating had been heated and transparentized, such a separation was no longer possible. This behavior is to be contrasted with that of coatings such as described in Examples 3–5.

*"Carbowax" 6000 melts at 59–61° C., whereas a mixture of the wax with the nitrocellulose heated for 20 miutes at 80° C. with stirring and cooled to solid form was found to melt at 79.5–82.5° C., thus showing that the two components are mutually compatible.*

A particular advantage of our new paper lies in its ability to copy printed, typewritten or other graphic material accurately and sharply under the peculiar conditions herein described and illustrated, i. e. in heat-conductive contact with the intensely irradiated graphic subject-matter.

A possible explanation of the previous lack of a copying-paper capable of producing sharp and clear images in a fusible layer by the novel method here employed lies in the lack of appreciation, in the prior art, of the effect of various factors influencing such reproduction. The most important of these factors will now be mentioned.

While many sources of radiant energy may be used in our process, as previously noted, the most convenient source is the incandescent electrically-heated filament in a suitable reflector. The intensity of the radiation from such source is limited by the melting-point of the material, usually tungsten, of which the filament is constructed. Our copying-paper must therefore be designed to print at temperatures which it is possible to reach by irradiation of the graphic material from such source of radiant energy.

Radiation of the intra-red-absorptive inked portion of a printed page causes a rapid rise in temperature at such points; radiation of the surrounding ink-free areas also causes a less pronounced, but nevertheless definite, heating effect. Prolonged irradiation consequently tends to produce an optically observable effect over the entire surface of the copying-paper, and is to be avoided. The copying-paper must therefore be capable of rapid printing.

For copying both fine detail and massive or blocky areas, we have found that an appreciable interval, measured as hereinafter described, between start and completion of fusion of the fusible layer is highly desirable. When this interval is too small, either the fine lines of the graphic material are not copied, or the heavier areas are badly blurred. The background area, however, remains fully non-transparent and provides a high degree of contrast. On the contrary, when the reaction interval is too extended, both fine lines and blocky portions are printed, but the entire sheets is darkened and the contrast between printed and unprinted areas is reduced.

At the lower temperatures, corresponding more closely with the ambient temperature, the temperature interval may be quite small, less than a degree centigrade being found effective in the neighborhood of 60° C. At the higher temperatures, a more extended interval has been found necessary in order to provide clear and distinct copies of subject-matter containing both fine detail and heavy massive areas. Thus at 100° C. an interval of about 5–15° C. is preferred, and good results have been secured with papers which showed an interval of as high as about 25° C. when tested as herein indicated. However, at higher intervals, the reproduced letters showed very little contrast in relation to the background.

We have found that a change in any one of the components of our composite sheet materal may have a considerable effect on the ability of the material to produce acceptable copies. For example, differences have been noted in the copying characteristics of the sheet on substitution of a particularly dense backing such as heavy parchment-paper for the paper of Example 1; or on the application of an increased thickness of undercoat; or on the use of a dyed paper backing in place of a pigmented undercoat on a paper support. Differences in the purity and degree of dispersion of the fusible material, and in the amount and kind of binder, and in the thickness of the fusible layer, have produced noticeable differences in the copying characteristics of the sheet, as has the amount of film-forming material applied as the protective surface coating. It has therefore been found impossible to define accurately the requirements of these copying-papers in terms of classes of components and proportions thereof.

We have, however, been successful in devising a test method for determining the suitability of specific sheet materials as copying-papers. In this method, a brass bar is heated at one end to establish a temperature gradient throughout its length, and is pressed for 1–2 seconds against the copying-paper supported on a rough-surfaced sheet of sponge rubber. Knowing the temperature at different points along the bar, it is then possible by inspection of the heated paper to determine the temperature at which the sheet first starts to show a visible change, as well as the minimum temperature at which maximum visible change is obtained, and from these values to determine the conversion range.

The conversion temperatures and ranges of temperatures previously enumerated herein have in each case been determined by means of the test method described. In many cases the temperature range within which the visible change occurs in the copying-paper, when so tested, is not the same as the melting point of the fusible material itself. Thus in Example 5, a wax having a reported melting point of 65° C. was the sole fusible material in each of the several copying-papers transparentizing at 67° C., 83° C., 95° C., etc. Furthermore the presence of traces or larger amounts of plasticizers or other modifiers frequently has an effect on the melting-point of the fusible particles as well as on the temperature of visible change of the coating. Nevertheless we have found that our normally transparent stable organic fusible solid material should have a melting-point within the range of about 60–115° C. in order to be adapted to the production of our novel copying-paper.

It will be apparent from the foregoing that the temperature interval over which the visible change occurs, and its location on the temperature scale, is only partly a function of the true melting-point of the fusible compound, and depends also on the several other components of the copying-paper as well as on the test method employed.

Heat-sensitive copying-papers prepared according to Examples 1–4 were tested by the above method, with results as follows:

| Example | Temperature Interval for Visible Change | | |
|---|---|---|---|
| | Initial, ° C. | Final, ° C. | Interval, ° C. |
| 1 | 100 | 113 | 13 |
| 2 | 87 | 95 | 8 |
| 3 | 65 | 67 | 2 |
| 4 | 65 | 67 | 2 |

The amount and condition of the binder component of the heat-sensitive coating is of considerable significance to the copying ability of the sheet. The binder is infusible at the temperature of fusion of the fusible particles. The binder material must be transparent, at least in thin continuous films. It must have substantially the same refractive index as the fusible material, so that when combined together in the heated coating the combination does not cause scattering of light but instead is clear and transparent.

The binder must be present in an amount sufficient to hold the particles in place, but not to such an extent as to prevent the obtaining of a distinct visible change on heating. Very small amounts of binder are quite effective, as shown in Examples 1 and 2, where the ratio of infusible binder to fusible particles is about 5–10 to 100. Much larger amounts, as used in Examples 3–5, may also be employed and are preferred in many instances.

The binder may, as shown by the examples, be present in amounts of from about 5% to about 50% based on the total of binder plus fusible particles, and depending on the structure of the binder stratum. About 5–10% of binder is sufficient, as shown by Examples 1 and 2, to bond the fusible particles together and to the supporting base. At these low proportions the transparent binder stratum is completely masked and the coating rendered non-transparent by the high percentage of fusible particles. At increased proportions of binder, e. g. between about 15% and about 50%, some of the binder itself must contribute to the light-diffusing property of the coating in order to provide a desirably non-transparent heat-sensitive coating. At proportions much above 50% of binder, the amount of fusible particles is insufficient to provide adequate visible contrast between the unheated and the heated areas.

While the final heated and cooled area of the copying-paper need not be transparent, it will be obvious that the optical change on which the copying process depends is in every case the result of a transparentization phenomenon caused by fusion of the fusible particles. Thus in the structure of Figures 1 and 2 of the drawing, the initially non-transparent heat-sensitive coating is transparentized on heating, and the transparent portion, or the supporting base beneath it, is distinctively visible against the surrounding non-transparent area. In the structure of Figures 3–5, the non-transparent coating initially obscures a color layer, which then becomes visible through the coating when the same is transparentized on heating.

To provide for such transparentization, it is necessary that a number of requirements, already indicated to some extent, be fulfilled. The material of which the fusible particles are composed must itself be transparent. The particles must be capable of melting and fusing within the over-all temperature range obtainable in the thermographic process. The fusible material must neither decompose nor volatilize within these temperatures. Other materials which might cause degradation of the supporting base on the binder or other components, or which are toxic to handle, or which are unstable when exposed to actinic light or atmospheric moisture or oxygen, might be temporarily adaptable but would be of no commercial interest in producing heat-sensitive copying-papers for the reproduction of printed, typed, and similar graphic matter, and such unstable materials are specifically excluded.

The fused material must be capable of wetting the non-fusible binder, and the two should have substantially the same refractive index. The interfacial relationships between binder and fusible material may of course be controlled to some extent by addition of small amounts of soluble wetting agents, plasticizers, or the like. Thus the dioctyl phthalate of Example 3 is observed to contribute to the transparency of the final heated coating, which in the absence of this or equivalent material may be slightly hazy or translucent rather than fully transparent.

*Coatings formed of mutually compatible fusible and binder materials, as shown in the foregoing examples, produce permanent copies when heat-activated in the manner described. A well-known method of determining mutual compatibility involves determining the melting-point of the fusible material alone and of a mixture of the fusible material and binder material after heating somewhat above the melting point of the former, as indicated in connection with Examples 1 and 6. A substantially unchanged melting-point indicates lack of compatibility, and conversely, a change in melting point indicates mutual compatibility.*

In the light of the above discussion of the principles underlying the operation and structure of the novel products of the present invention, it has been found relatively easy to select from available listings of fusible materials specific products which are, and others which are not, operable in the invention.

Paper, various treated papers, glassine, vinyl films, films of terephthalic acid-ethylene glycol resins, and cellulosic films such as cellophane, cellulose acetate and ethyl cellulose films all provide suitable supporting base sheet material for our novel copying-paper. They may be opaque, colored, or coated with opacifying or coloring agents, in which case they are applicable to structures such as illustrated by Figures 1, 2, 3, and 4 of the drawing, and to "back-printing" applications. They may be non-transparent but infra-red-transmitting; one example of such a structure is a red cellophane film dyed to non-transparency with an infra-red-transmitting dyestuff such as Ponsol jade green. They may also be both transparent and infra-red-transmitting; and this type of base sheet, particularly in structures such as that of Figure 5, is of especial interest since the copying-paper may be used by either front-printing or back-printing techniques. Other fibrous and non-fibrous webs, including certain fabrics, are also suitable for one or another of the structures herein described. However, it has been found that metal foil and other equivalent materials which have high heat conductivity are unsuitable, and hence metallic or equivalent supporting base materials are specifically excluded.

Additional examples of heat-sensitive copying-paper made in accordance with the present invention will now be presented so that various aspects of the invention may be better understood and appreciated. The dispersions were produced by ball-milling to an extremely fine state of subdivision.

EXAMPLE 7

| | Parts |
|---|---|
| 40% dispersion of glycol monostearate in acetone | 20 |
| 10% solution of cellulose acetate in 50 parts acetone, 40 parts toluene | 20 |
| Toluene | 3 |
| Diethyl phthalate | 1 |

The mixture was coated on thin glassine at a wet thickness of 3 mils and dried at room temperature. The white coating transparentized at about 60° C.

*Heating of a mixture of 8 parts of glycol monostearate, 2 parts of cellulose acetate, and 1 part of diethyl phthalate at 115° C. for 20 minutes with stirring produced a blend which when cooled and tested as in Example 1 was found to melt at 53.5–54.5° C., whereas a mixture of 8 parts of glycol monostearate and 1 part of diethyl phthalate similarly treated and tested was found to melt at 52.5–53.5° C., thus showing that the fusible material and binder material were compatible.*

EXAMPLE 8

| | Parts |
|---|---|
| 40% dispersion of "Opalwax" in equal parts of ethyl acetate and heptane | 25 |
| 10% solution of ethyl cellulose in equal parts of ethyl acetate and xylol | 35 |

The mixture was coated on No. 600 cellophane at a wet thickness of 3 mils and dried at room temperature. The white coating transparentized at about 83–87° C.

"Opalwax" is a hydrogenated castor oil wax *which is compatible with ethyl cellulose as shown by a comparison of its melting-point (85°–87° C.) with that of a blend of 100 parts wax and 35 parts ethyl cellulose after heating for 20 minutes at 90° C. The melting point of the solidified blend was 103–108° C.*

EXAMPLE 9

| | Parts |
|---|---|
| 11% dispersion of lead myristate in acetone | 30 |
| 10% solution of nitrocellulose (125 sec.) in equal parts of ethyl acetate and xylol | 30 |

Coated on cellophane and dried, the white coating transparentized at about 90° C.

EXAMPLE 10

| | Parts |
|---|---|
| 2,4-dinitro phenetole (as dispersed solid particles) | 4 |
| Polyvinyl alcohol (in water solution) | 1 |

The dried coating on black-colored paper was initially non-transparent. Transparentization occurred at about 81-82° C.

EXAMPLE 11

| | Parts |
|---|---|
| "Cornelowax 1469" (as dispersed solid particles) | 14.4 |
| Nitrocellulose (50 sec.) | 4.1 |
| Ethyl alcohol | 81.5 |

The dried coating, on colored paper, was surface-coated with a very thin layer of a solution of 5 parts ethyl cellulose in 71.25 parts of toluene and 23.75 parts of heptane. The copying-paper was suitable for "back-printing." Under test, the visible change, caused by transparentizing of the heat-sensitive layer, occurred at about 64° C.

In the next several examples, only the formula for the heat-sensitive coating composition is given, the transparentizing temperature being the same, namely, 64° C., in each case where the coating was applied to a standard black label paper as used in Example 11.

EXAMPLE 12

| | Parts |
|---|---|
| "Cornelowax 1469" (as dispersed solid particles) | 17.5 |
| Polyvinyl butyral (in solution) | 2.14 |
| Acetone | 80.75 |

*"Cornelowax" No. 1469 is compatible with polyvinyl butyral as shown by an increase in melting point of the heat-blended mixture over that of the wax alone, and copies made of type-written letters or similar graphic subject-matter with the copying-paper of this example are found to be permanent, the heat-transparentized areas of the coating remaining transparent on prolonged aging at normal storage temperatures.*

EXAMPLE 13

| | Parts |
|---|---|
| "Cornelowax 1469" (as dispersed solid particles) | 17.15 |
| "Pliolite" (in solution) | 4.29 |
| Heptane | 78.5 |

EXAMPLE 14

| | Parts |
|---|---|
| "Cornelowax 1469" (as dispersed solid particles) | 16 |
| Polyvinyl acetate (in solution) | 4 |
| Ethyl alcohol | 80 |

EXAMPLE 15

| | Parts |
|---|---|
| "Cornelowax 1469" (as dispersed solid particles) | 19 |
| Methyl methacrylate polymer (in solution) | 4 |
| Acetone | 38 |
| Toluene | 38 |

EXAMPLE 16

| | Parts |
|---|---|
| "Cornelowax 1469" (as dispersed solid particles) | 15 |
| "Parlon" chlorinated rubber (in solution) | 7.5 |
| Acetone | 60 |
| Toluene | 17.5 |

*Of the foregoing detailed working examples, with the exception of those of Examples 10, 14* and *16, the binder component and the fusible solid component are characterized by mutual compatibility, as shown by a change in melting point of the heat blended mixture of binder and fusible solid as compared with the melting point of the fusible solid alone.*

A number of additional examples of typical fusible materials which are suitable as the fusible particles for use in our novel heat-sensitive copying-papers are as follows:

Laurane
Cerotene
Ceryl alcohol
Coumarin
Dicyclohexyl phthalate
Dimethyl-4-nitrophthalate
Dimethyl-m-phthalate
Diphenyl
Nonacosane

What we claim is as follows:

1. Method of making a heat-senstive copying-paper adapted to the copying of graphic subject-matter by "front-printing" as herein described, and comprising coating a transparent intra-red-transmitting cellulosic sheet material with a dispersion of particles of a normally transparent stable organic fusible solid in a solution of a transparent film-forming binder in a volatile solvent, removing said solvent, without fusing or dissolving said particles so as to provide a non-transparent, infra-red-transmitting, heat-sensitive layer, and applying a further coating of an infra-red-transmitting coloring agent in a binder solution, and drying said further coating, so as to provide a non-transparent, infra-red-transmitting color and protective surface layer; said fusible solid being further characterized by melting to a liquid without appreciable volatilization or decomposition at a temperature within the range of about 60–115° C., having good wetting properties toward the binder of said heat-sensitive coating, and having substantially the same refractive index as the binder of said heat-sensitive coating.

2. A heat-sensitive copying-paper adapted, on being placed in heat-conductive contact with a typewritten message and on irradiation of said message with high-intensity illumination, to provide a reproduction of said message without splitting or offsetting, said copying-paper comprising in order a thin, transparent, infra-red-transmitting cellulosic sheet backing, a heat-sensitive coating, and an infra-red-transmitting color layer; said coating comprising particles of a normally transparent stable organic fusible solid melting to a liquid without appreciable volatilization or decomposition at a temperature within the range of about 60–115° C., and distributed throughout a thin stratum of transparent film-forming organic binder which is infusible within said range; said meltable organic solid when in liquid form having good wetting properties toward said organic binder, and said organic solid and said binder having substantially the same refractive index.

3. A heat-sensitive copying-paper adapted, on being placed in heat-conductive contact with a typewritten message and on irradiation of said message with high-intensity illumination, to provide a reproduction of said message without splitting or offsetting, said copying-paper comprising in order a transparent, infra-red-transmitting cellulosic sheet backing, a heat-sensitive coating, and an infra-red-transmitting color layer; said coating comprising about 1–20 parts by weight of particles of a normally transparent stable organic fusible solid melting to a liquid without appreciable volatilization or decomposition at a temperature within the range of about 60–115° C., and distributed throughout a thin stratum of about one part of a transparent film-forming organic binder which is infusible within said range; said meltable organic solid when in liquid form having good wetting properties toward said organic binder, and said organic solid and said binder having substantially the same refractive index.

4. A heat-sensitive copying-paper adapted, on being placed in heat-conductive contact with a typewritten message and on irradiation of said message with high-intensity illumination, to provide a reproduction of said message without splitting or offsetting; said copying-paper comprising in order a transparent, infra-red-transmitting cellulosic sheet backing, a heat-sensitive coating, and an infra-red-transmitting color layer; said coating comprising about 1–6 parts by weight of particles of a normally transparent stable organic fusible solid melting to a liquid without appreciable volatilization or decomposition at a temperature within the range of about 60–115° C., and distributed throughout a thin stratum of about one part of a transparent film-forming organic binder which is infusible within said range; said meltable organic solid when in liquid form having good wetting properties toward said organic binder, and said organic solid and said binder having substantially the same refractive index.

5. A heat-sensitive copying-paper adapted, on being placed in heat-conductive contact with a typewritten message and on irradiation of said message with high-intensity illumination, to provide a reproduction of said message without splitting or offsetting; said copying-paper comprising in order a transparent, infra-red-transmitting cellulosic sheet backing, a heat-sensitive coating, and an infra-red-transmitting color layer; said coating comprising about 1–6 parts by weight of particles of a transparent wax having a sharp melting point within the range of about 60–85° C., and distributed throughout a thin stratum of about one part of a transparent film-forming organic binder which is infusible within said range; said wax when in liquid form having good wetting properties toward said organic binder, and said wax and said binder having substantially the same refractive index.

6. A heat-sensitive copying-paper adapted, on being placed in heat-conductive contact with a typewritten message and on irradiation of said message with high-intensity illumination, to provide a reproduction of said message without splitting or offsetting; said copying-paper comprising in order a transparent, infra-red-transmitting cellulosic sheet backing, a heat-sensitive coating, and an infra-red-transmitting color layer; said coating comprising about 1–6 parts by weight of particles of a transparent wax having a sharp melting point within the range of about 60–85° C., and distributed throughout a thin stratum of about one part of a nitrocellulose binder infusible within said range; said wax when in liquid form having good wetting properties toward said organic binder, and said wax and said binder having substantially the same refractive index.

7. A heat-sensitive copying-paper adapted, on being placed in heat-conductive contact with a typewritten message and on irradiation of said message with high-intensity illumination, to provide a reproduction of said message without splitting or offsetting; said copying-paper comprising in order a thin, transparent, infra-red-transmitting cellulosic sheet backing, a heat-sensitive coating, and an infra-red-transmitting color layer; said coating comprising about 2.8 parts of particulate hydrogenated fatty oil wax melting at about 65° C., about one part of nitrocellulose binder, and a small amount of a liquid plasticizer.

8. A heat-sensitive copying-paper adapted, on being placed in heat-conductive contact with a typewritten message and on irradiation of said message with high-intensity illumination, to provide a reproduction of said message without splitting or offsetting, said copying-paper comprising in order a thin, transparent backing, a heat-sensitive coating, and an infra-red-transmitting color layer; said coating comprising particles of a normally transparent stable organic fusible solid melting to a liquid without appreciable volatilization or decomposition at a temperature within the range of about 60–115° C., and distributed throughout a thin stratum of transparent film-forming organic binder which is infusible within said range; said meltable organic solid when in liquid form having good wetting properties toward said organic binder, and said organic solid and said binder having substantially the same refractive index.

9. A heat-sensitive copying-paper adapted, on being placed in heat-conductive contact with a typewritten message and on irradiation of said message with high-intensity illumination, to provide a reproduction of said message without splitting or offsetting, said copying-paper comprising in order a thin, transparent backing, a heat-sensitive coating, and a color layer; said coating comprising particles of a normally transparent stable organic fusible solid melting to a liquid without appreciable volatilization or decomposition at a temperature within the range of about 60–115° C., and distributed throughout a thin stratum of transparent film-forming organic binder which is infusible within said range; said meltable organic solid when in liquid form having good wetting properties toward said organic binder, and said organic solid and said binder having substantially the same refractive index.

10. The method of making a heat-sensitive copying-paper adapted to the copying of graphic subject-matter by "front-printing" as herein described, and comprising coating a thin transparent sheet material backing member with a dispersion of particles of a normally transparent stable organic fusible solid in a solution of a transparent film-forming binder in a volatile solvent, removing said solvent, without fusing or dissolving said particles so as to provide a non-transparent heat-sensitive layer, and applying a further coating of a coloring agent in a binder solution, and drying said further coating, so as to provide a non-transparent color and protective layer; said fusible solid being further characterized by melting to a liquid without appreciable volatilization or decomposition at a temperature within the range of about 60–115° C., having good wetting properties toward the binder of said heat-sensitive coating, and having substantially the same refractive index as the binder of said heat-sensitive coating.

*11. A structure comprising a non-metallic supporting base and a non-transparent, heat-sensitive coating thereon, said structure being adapted, on being placed in heat-conductive contact with a typewritten message and on irradiation of said message with high-intensity illumination, to provide a reproduction of said message in the form of permanently visibly distinct characters within the non-transparent field, and without splitting or offsetting of the coating; said coating comprising particles of a normally transparent stable organic fusible solid melting to a liquid without appreciable volatilization or decomposition at a temperature within the range of about 60–115° C., and distributed throughout a thin stratum of transparent film-forming organic binder which is infusible within said range; said meltable organic solid when in liquid form having good wetting properties toward said organic binder, and said organic solid and said binder being mutually compatible, as indicated by an increase in melting-point of the heat-blended mixture over that of the organic solid alone, and having substantially the same refractive index.*

*12. A heat-sensitive copying-paper comprising a thin transparent backing and a non-transparent, heat-sensitive coating thereon, said copying paper being adapted on being placed in heat-conductive contact with a typewritten message and on irradiation of said message with high-intensity illumination, to provide a reproduction of said message in the form of permanently visibly distinct characters within the non-transparent field, and without splitting or offsetting of the coating; said coating comprising about 1–20 parts by weight of particles of a normally transparent stable organic fusible solid melting to a liquid without appreciable volatilization or decomposition at a temperature within the range of about 60–115° C., and distributed throughout a thin stratum of about one part of a transparent film-forming organic binder which is infusible within said range; said meltable organic solid when in liquid form having good wetting properties toward said organic binder, and said organic solid and said binder being mutually compatible, as indicated by an increase in melting-point of the heat-blended mixture over that of the organic solid alone, and having substantially the same refractive index.*

*13. A heat-sensitive copying-paper comprising a thin transparent backing and a non-transparent, heat-sensitive coating thereon, said copying-paper being adapted, on*

*being placed in heat-conductive contact with a typewritten message and on irradiation of said message with high-intensity illumination, to provide a reproduction of said message in the form of permanently visibly distinct characters within the non-transparent field, and without splitting or offsetting of the coating; said coating comprising about 1–6 parts by weight of particles of a normally transparent stable organic fusible solid melting to a liquid without appreciable volatilization or decomposition at a temperature within the range of about 60–115° C., and distributed throughout a thin non-transparent porous stratum of one part of transparent film-forming organic binder which is infusible within said range; said meltable organic solid when in liquid form having good wetting properties toward said organic binder, and said organic solid and said binder being mutually compatible, as indicated by an increase in melting-point of the heat-blended mixture over that of the organic solid alone, and having substantially the same refractive index.*

*14. A heat-sensitive copying-paper comprising in order a non-metallic supporting base, a non-transparent heat-sensitive coating, and a protective surface coating, said copying-paper being adapted, on being placed in heat-conductive contact with a typewritten message and on irradiation of said message with high-intensity illumination, to provided a reproduction of said message in the form of permanently visibly distinct characters within the non-transparent coating, and without splitting or offsetting of the coating; one of said base and said surface coating being transparent and the other being colored; said coating comprising particles of a normally transparent stable organic fusible solid melting to a liquid without appreciable volatilization or decomposition at a temperature within the range of about 60–115° C., and distributed throughout a thin stratum of transparent film-forming organic binder which is infusible within said range; said meltable organic solid when in liquid form having good wetting properties toward said organic binder, and said organic solid and said binder being mutually compatible, as indicated by an increase in melting-point of the heat-blended mixture over that of the organic solid alone, and having substantially the same refractive index.*

*15. A heat-sensitive copying-paper comprising in order a thin transparent backing, a heat-sensitive coating, and a transparent, infra-red-transmitting protective surface coating, said copying-paper being adapted, on being placed in heat-conductive contact with a typewritten message and on irradiation of said message with high-intensity illumination, to provide a reproduction of said message in the form of permanently visibly distinct characters within the non-transparent field and without splitting or offsetting; said heat-sensitive coating comprising about 1–20 parts by weight of particles of a normally transparent stable organic fusible solid melting to a liquid without appreciable volatilization or decomposition at a temperature within the range of about 60–115° C., and distributed throughout a thin stratum of about one part of a transparent film-forming organic binder which is infusible within said range; said meltable organic solid when in liquid form having good wetting properties toward said organic binder, and said organic solid and said binder being mutually compatible, as indicated by an increase in melting-point of the heat-blended mixture over that of the organic solid alone, and having substantially the same refractive index.*

*16. A heat-sensitive copying-paper adapted, on being placed in heat-conductive contact with a typewritten message and on irradiation of said message with high-intensity illumination, to provide a permanent reproduction of said message without splitting or offsetting, said copying-paper consisting essentially of a colored non-metallic supporting base and a non-transparent heat-sensitive coating; said coating comprising particles of a normally transparent stable organic fusible solid melting to a liquid without appreciable volatilization or decomposition at a temperature within the range of about 60–115° C., and distributed throughout a thin stratum of transparent film-forming organic binder which is infusible within said range; said meltable organic solid when in liquid form having good wetting properties toward said organic binder, and said organic solid and said binder being mutually compatible, as indicated by an increase in melting-point of the heat-blended mixture over that of the organic solid alone, and having substantially the same refractive index.*

*17. A heat-sensitive copying-paper adapted, on being placed in heat-conductive contact with a typewritten message and on irradiation of said message with high-intensity illumination, to provide a permanent reproduction of said message without splitting or offsetting of the coating, said copying-paper comprising in order a non-metallic supporting base, a color layer, a non-transparent heat-sensitive coating, and a transparent infra-red-transmitting protective surface coating; said heat-sensitive coating comprising particles of a normally transparent stable organic fusible solid melting to a liquid without appreciable volatilization or decomposition at a temperature within the range of about 60–115° C., and distributed throughout a thin stratum of transparent film-forming organic binder which is infusible within said range; said meltable organic solid when in liquid form having good wetting properties toward said organic binder, and said organic solid and said binder being mutually compatible, as indicated by an increase in melting-point of the heat-blended mixture over that of the organic solid alone, and having substantially the same refractive index.*

*18. A heat-sensitive copying-paper adapted, on being placed in heat-conductive contact with a typewritten message and on irradiation of said message with high-intensity illumination, to provide a reproduction of said message without splitting or offsetting, said copying-paper comprising in order a thin, transparent, infra-red-transmitting cellulosic sheet backing, a heat-sensitive coating, and an infra-red-transmitting color layer; said coating comprising particles of a normally transparent stable organic fusible solid melting to a liquid without appreciable volatilization or decomposition at a temperature within the range of about 60–115° C., and distributed throughout a thin stratum of transparent film-forming organic binder which is infusible within said range; said meltable organic solid when in liquid form having good wetting properties toward said organic binder, and said organic solid and said binder being mutually compatible as indicated by an increase in melting-point of the heat-blended mixture over that of the organic solid alone, and said organic solid and said binder having substantially the same refractive index.*

*19. A heat-sensitive copying-paper adapted, on being placed in heat-conductive contact with a typewritten message and on irradiation of said message with high-intensity illumination, to provide a reproduction of said message without splitting or offsetting, said copying-paper comprising in order a transparent, infra-red-transmitting cellulosic sheet backing, a heat-sensitive coating, and an infra-red-transmitting color layer; said coating comprising about 1–20 parts by weight of particles of a normally transparent stable organic fusible solid melting to a liquid without appreciable volatilization or decomposition at a temperature within the range of about 60–115° C., and distributed throughout a thin stratum of about one part of a transparent film-forming organic binder which is infusible within said range; said meltable organic solid when in liquid form having good wetting properties toward said organic binder, and said organic solid and said binder being mutually compatible as indicated by an increase in melting-point of the heat-blended mixture over that of the organic solid alone, and said organic solid*

*and said binder having substantially the same refractive index.*

References Cited in the file of this patent or the original patent

UNITED STATES PATENTS

| | | |
|---|---|---|
| 1,783,442 | Mayer | Dec. 2, 1930 |
| 1,944,293 | Martinez | Jan. 23, 1934 |
| 2,019,737 | Sheppard | Nov. 5, 1935 |
| 2,269,038 | Perry | Jan. 6 ,1942 |
| 2,299,991 | Kallock | Oct. 27, 1942 |
| 2,313,808 | Dalton | Mar. 16, 1943 |
| 2,336,299 | Russell | Dec. 7, 1943 |
| 2,433,515 | Jahoda | Dec. 30, 1947 |
| 2,519,660 | James | Aug. 22, 1950 |
| 2,534,326 | Weaver | Dec. 19, 1950 |
| 2,550,473 | Green | Apr. 24, 1951 |